Dec. 25, 1923.   W. HERRMANN   1,478,516
MACHINE FOR AUTOMATICALLY SHADING PLANTS AND UNCOVERING SAME
Filed April 6, 1922   2 Sheets-Sheet 2
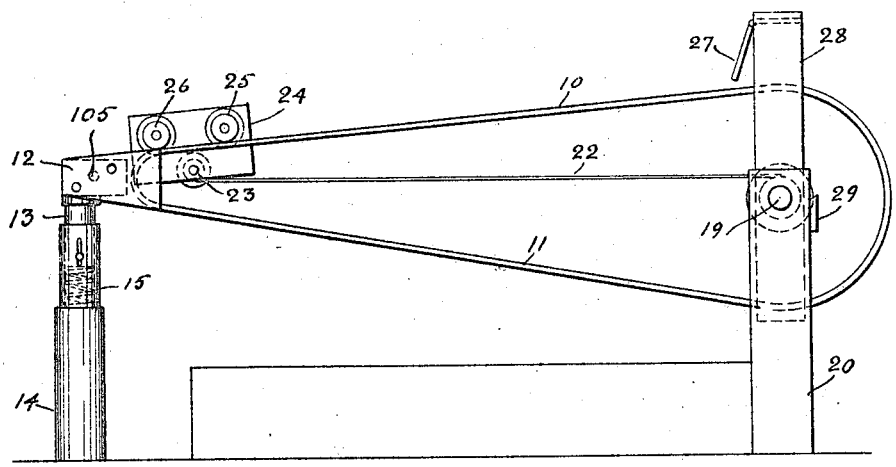
Fig. 5.
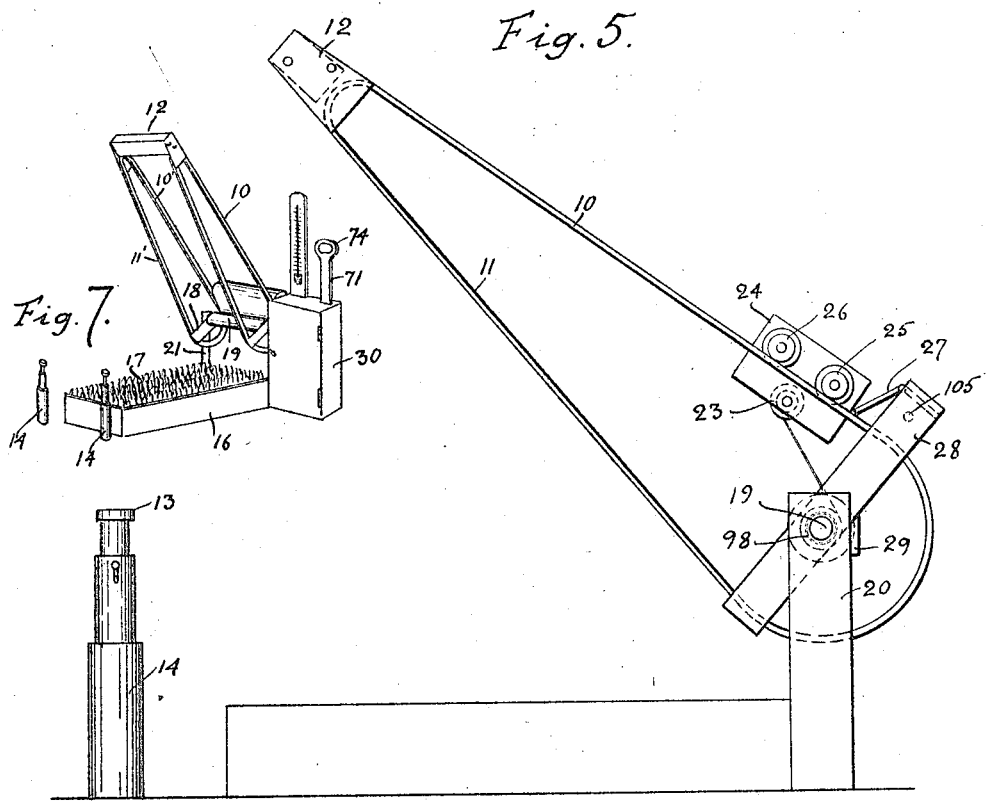
Fig. 7.
Fig. 6.
INVENTOR.
Wilhelm Herrmann
BY George C. Heinitz
ATTORNEY Patented Dec. 25, 1923.

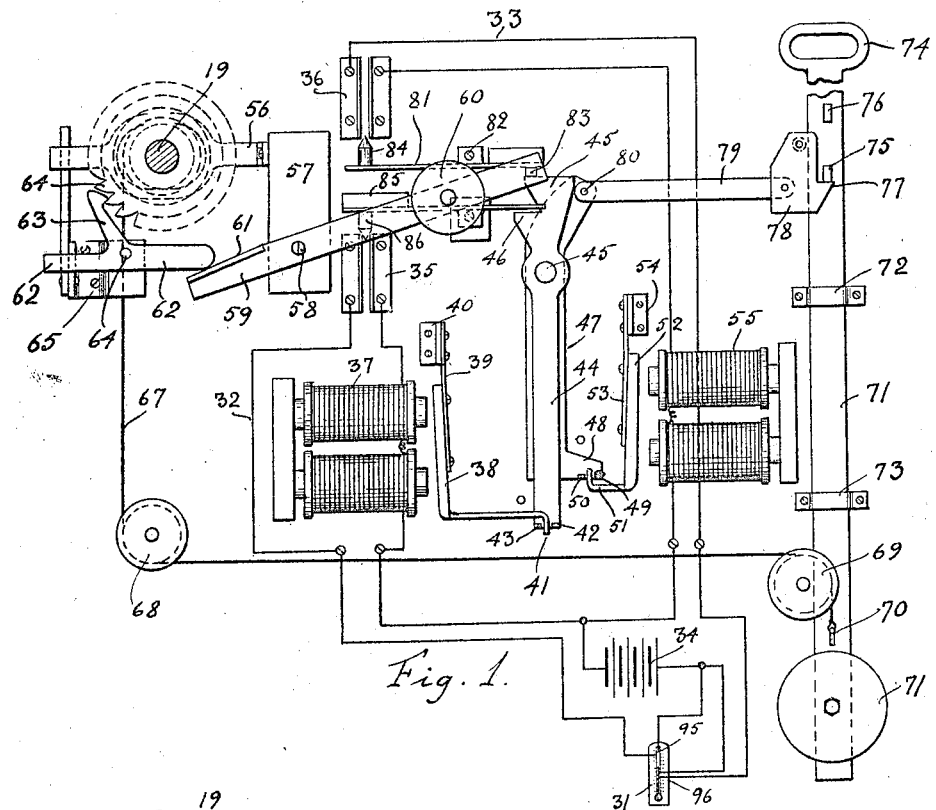

1,478,516

UNITED STATES PATENT OFFICE.

WILHELM HERRMANN, OF NEW YORK, N. Y.

MACHINE FOR AUTOMATICALLY SHADING PLANTS AND UNCOVERING SAME.

Application filed April 6, 1922. Serial No. 550,028.

*To all whom it may concern:*

Be it known that I, WILHELM HERRMANN, a citizen of Germany, residing at New York, county of New York, and State of New York, have invented certain new and useful Improvements in Machines for Automatically Shading Plants and Uncovering Same, of which the following is a specification.

This invention relates to a shading and uncovering apparatus for plants and is principally intended for use by farmers, truck gardeners or the like.

The principal object of the present invention is the provision of an apparatus for automatically shading plants in cold frames, hot houses, beds, etc. against the rays of the sun, and for uncovering the plants if such protection becomes unnecessary.

Another object of the invention is the provision of electrically operated means for shading the plants in cold frames or beds for instance against the withering influence of the sun rays by automatically placing a shade over the plants if the temperature rises above a certain predetermined point and for removing the shade as soon as the temperature falls below a certain perdetermined point.

A further object of the invention is the provision of an apparatus of this character which includes electro-magnetically operated weighted levers for releasing the shade to cover the plants in a cold frame or bed, etc. and to uncover the plants if the shade becomes unnecessary at certain predetermined temperatures.

A still further object of the invention is the provision of an apparatus of this kind in which the shades of a plurality of cold frames or beds may be simultaneously operated.

Other objects of my invention will become more fully apparent as the description thereof proceeds, and will then be more specifically pointed out in the appended claims.

In the accompanying drawing, forming a material part of this disclosure:

Figure 1 is a front view of the electro-mechanical operating mechanism.

Figure 2 is a top plan view thereof.

Figure 3 is a modified form of the weighted hand lever mechanism.

Figure 4 is a detail view of the clutch mechanism.

Figure 5 illustrates the apparatus in its plant shading position, in side view.

Figure 6 illustrates the apparatus in side view in its plant uncovering position.

Figure 7 is a perspective view of the assembled apparatus.

The apparatus comprises a frame composed of two pairs of looped members 10, and 11, and 10' and 11', the pairs of members being connected at their free ends by a transverse weighted bar 12, adapted, when in lowered position to rest upon the heads 13 of posts 14, which are spring cushioned as indicated at 15. These posts 14 are erected near the ends of cold frames 16, for instance, in which plants 17 are located, which are to be shaded.

Tranverse rods 18 are arranged in the looped ends of the frame members and a shaft 19 is passed with its ends through vertical standards 20 and 21 in which it is journaled. This shaft carries a roll of canvas or suitable material 22, one end of which is secured to said shaft, while its other end is secured to a roller 23 of a carriage 24, the rollers 25 and 26 of which are traveling along the upper edge of one of the members 10. The downward movement of the carriage 24 is limited by a stop pin 27 on a bar 28, while the rearward tilting if this bar 28 is limited by means of a shoulder 29 on post 20.

The operating mechanism for the apparatus is enclosed in a casing 30 erected by the side of a cold frame 16.

This operating mechanism comprises a thermometer 31 provided with a suitable graduation and with contacts of the well known construction which will be engaged by a swimmer contact to close a circuit at a predetermined lower and a predetermined higher temperature in order to operate, as the case may be, the shedding or uncovering mechanism. In these circuits, generally indicated at 32 and 33 respectively, a battery 34 is located and switches 35 and 36.

The circuit 32 including switch 35 includes also an electro-magnet 37, the armatures of which, when energized attract an operating lever 38, one end of which is secured by means of a leaf spring 39 to an angle iron 40 secured to a board in casing 30. The other arm of lever 38 has a hook shaped end 41 engaged between shoulders 42 and 43 on the lower end of a lever 44 pivoted near its upper end as at 45, to a board in the casing. The upper end of lever 44 is formed into a head 45 provided with a laterally disposed shoulder 46.

At the pivot point 45 is also pivotally secured a lever 47 spaced from lever 44, the lower arm 48 of which carries shoulders 49 and 50 between which the hooked end 51 of a lever 52 engages, the upper end of which is secured by means of a leaf spring 53 to an angle piece 54 on a board within the casing. The electro-magnet 55 located in circuit 33, when energized, will attract lever 52.

To the end of shaft 19 entering casing 30, a bracket 56 is secured, carrying at one end a depending plate 57 to which is pivoted as at 58 intermediate its ends a lever 59 carrying a weight 60 near one of its ends, while its other end is carrying a plate 61 adapted to engage the end of a three armed lever 62, the arm 63 of which is formed into a pawl to engage the teeth of a ratchet wheel 64 on shaft 19, while the lever 62 is pivotally secured, as at 64, to a plate 65 in the casing.

Near the inner wall of the casing the shaft 19 carries a pulley 66 over which a cable 67 is guided which is also guided over rollers 68 and 69 in the casing, and the outer end of which is attached to an eye 70 of a hand lever 71 guided in the casing through bands 72 and 73, and carrying at its lower end a weight 71 while its upper end is extended out of the casing and carries a handle 74. The lever 72 carries also two shoulders 75 and 76 near its upper end, adapted to be engaged by a finger 77 of plate 78 pivoted in the casing.

One arm of a horizontal link 79 is secured to the plate 78 while its other end is pivoted as at 80 to the upper end of lever 47. A weighted lever 81 is secured intermediate its ends, as at 82, to the casing and carries at its weighted end a boss 83 adapted to be engaged by the curved upper edge of lever 47, and at the opposite end a contact 84 adapted to enter between the rails of switch 36. Another weighted lever 85 carries at one end a contact 86 adapted to enter between the rails of switch 35, as its other end normally rests upon shoulder 46.

Within the casing the shaft 19 carries a sliding coupling member 87 adapted to engage a coupling member 88 laterally disposed to pulley 66, and a forked shifting member 89 engages a groove in said member 87 formed by an outer collar 89 and a shoulder on member 87. One end of said member 89 is hingedly secured, as at 90, to a plate 91 secured to plate 57 while the other end of member 89 is extended into the path of an upstanding arm 92 of lever 93 pivoted at 94, so that the downward movement of the rear end of lever 62 will operate the clutch.

The device operates in the following manner:

If the thermometer 31 under the influence of the rising sun indicates a rise in temperature above a predetermined degree, a contact will be closed at 95 to close circuit 32 while contact 86 is between the rails of switch 35, and electro-magnet 37 will be energized to attract lever 38 which by means of its arm 41 will draw bar 44 towards the electro-magnet while its head 45 will move in the opposite direction, and weighted lever 59, which is normally supported by head 45, will fall down into engagement with shoulder 46. The other end of the lever carrying the plate 61 will grip under lever 62 and turn lever 62 around pivot 64 to lower its rear end and to disengage pawl 63 from the teeth of ratchet 64 which normally holds the pairs of members 10 and 11 in elevated position which now under the weight of bar 12 will drop and allow the carriage 24 to unfold curtain 22 while traveling along member 10. At the same time the downward motion of the rear part of lever 62 will operate as shown in Figure 4 the clutch to release the weight holding the loop ends of the members 10 and 11 down.

The plants 17 in bed or frame 16 will now be protected by curtain 22 against the influence of the sun rays.

The parts will remain in this position until the thermometer will indicate a lowering of the temperature below a certain predetermined degree when a circuit will be closed at 96, while the contact 84 is connecting the two rails of switch 36, as the weighted end of lever 81 has lost its support upon the head 45 after the same has been displaced.

The energizing of electro-magnet 55 will result in the attraction of shoe or lever 52 which with its hooked end 51 will operate lever 47 to swing with its lower end towards the electro-magnet while its upper end is moved in the opposite direction to lift weighted bar 59, so that its plate 61 is allowing the lever 62 to engage with its arm the teeth of gear 64 again and the coupling members are engaged by the action of spring 97, so that the cable will come into play and raise the frame so that the carriage 24 will roll down and wind its curtain 22 upon roller or shaft 19 under the action of a curtain roller spring 98 in the usual manner. This movement is assisted by the downward movement of weighted bar 71 which is released by the disengagement of finger 77 from shoulder 75 under the action of link 79 which is pulled by the movement of the head of lever 47.

In Figure 3 a modified form of operating mechanism is illustrated which is adapted to replace the weighted bar 71.

If this form is to be used, the end of cable 67 is secured to a roller 99 which stands under the control of a spring adapted to rotate the same in the direction of the arrow 100.

The link 79 is secured with its outer end to a pawl 101 pivoted at 102 to a bracket 103, so that upon the release of the pawl the spring will wind up the cable and raise the frame 10, 11. When the frame is raised sufficiently, the boss 84 of lever 81 will be pressed out of engagement between the rails of switch 36 and the electro-magnet 55 will become de-energized so that its anchor 52 will move lever 47 to engage pawl 101 again with the teeth of a ratchet 104 and stop the action of the spring.

It will be clear that a number of these frames can be coupled by means of coupling rods 105 passed through the bars 12 or bars 28 so that a plurality of shading and uncovering apparatus can be operated for all the cold frames in one row from one operating apparatus of the construction described.

Having thus described my invention, what I claim as new, and desire to secure by Letters Patent of the United States is—

1. A plant shading and uncovering apparatus of the class described comprising a frame, electro-mechanically operated means for rasing and lowering said frame, thermometrically operated circuit closing means for operating said electro-mechanism means to lower said frame upon the rise in temperature above a certain predetermined point, and for raising said frame upon the falling of the temperature below a certain predetermined point, and means for coupling a plurality of frames for simultaneously shading and uncovering a multitude of planted cold frames arranged in one row.

2. In a plant shading and uncovering apparatus, a frame, mechanical means for normally holding said frame in its elevated position, said means comprising a ratchet, a pawl engaging the teeth of said ratchet, a weighted lever, and an operating lever provided with a head supporting one end of said weighted lever, electric means for operating said operating lever to drop one end of said weighted lever to raise its other end for operating said pawl to disengage it from said ratchet, for allowing a dropping of said frame, a thermometrically operated circuit closure for actuating said electric means upon the rising of the temperature above a predetermined point, a switch adapted to be opened upon the operation of said pawl, electro-mechanical means for returning said weighted lever into its normal position after each operation upon the sinking of the temperature below a certain predetermined level, for elevating said frame and returning it into its original position.

3. In a plant shading and uncovering apparatus of the character described, a frame, means for normally holding said frame in elevated position, electro-magnetically operated means for releasing said holding means to allow a lowering of said frame, thermometrically operated circuit closing means for actuating said electro-magnetically operated means at a predetermined highest temperature, and an operating lever, a weighted lever, connections between said weighted lever and said operating lever to hold said weighted lever normally in its elevated position, magnetic electric means for operating said operating lever and its connections to release said weighted lever to return into its original position, cables actuated by said weighted lever after its release to return said frame into its elevated position and rolling up said shade, and a thermometrically operated circuit closure for acutating said magnetic electric means upon the sinking of the temperature below a certain predetermined degree, and means for opening one circuit and closing the circuit for the first named circuit closing means.

4. In a plant shading and uncovering apparatus of the character described, a frame, a catch and a weighted cable for normally holding said frame in its elevated position, a means for disconnecting said cable upon the operation of said catch to lower said frame, an electric-magnetically operated means for releasing said catch from its engagement with said frame, a circuit and a means for automatically opening said circuit after each releasing operation of said catch, magneto-electric means for engaging said catch and for raising said frame, a second circuit and a thermometric circuit closer for actuating both electric magnetic means upon the rising of the temperature above, and falling of the same below a predetermined degree, and means for coupling a plurality of apparatus for one row of plant beds for simultaneous operation.

5. In a plant shading and uncovering apparatus of the character described, a frame, a shaft for said frame, a catch or ratchet mechanism for normally holding said frame in its elevated position, electro-magnetically and mechanically operated means for releasing said catch from said ratchet to allow a lowering of the frame, a weighted cable holding said frame in its elevated position, a clutch on the frame shaft, including a stationary and a sliding member, a pulley for said cable on said stationary member, a fork operated by said catch releasing means for operating said sliding member, to disengage said cable from said shaft, an electro-magnetically and mechanically operated weighted bar to which said cable is secured, adapted to be lowered when the temperature sinks below a certain predetermined point to pull said cable for elevating said frame.

6. In a plant shading and uncovering apparatus of the character described, comprising a movable frame, a pair of circuits, a battery, a contact thermometer adapted to close one of said circuits upon the rising of the temperature above a certain predetermined degree indicated by said thermometer, and to close the other of said circuits upon the sinking of the temperature below a certain predetermined degree indicated by said thermometer, an electro-magnet in each of said circuits, the electro-magnet in one of said circuits to operate means for releasing said frame to allow a lowering of the same, and the electro-magnet in the other of said circuits adapted to operate means for raising said frame, and a switch in each of said circuits adapted to be normally closed and to be opened after each operation of the operating means by said magnets.

7. In a plant shading and uncovering apparatus of the character described, including a frame, a shouldered operating lever having a head and a shoulder, a weighted lever normally resting with its weighted end upon the head of said lever and to fall upon the shoulder of said operating lever upon the operation of said lever by an electro-magnet, a pawl, said weighted lever releasing said pawl to allow a lowering of said frame upon its engagement of the shoulder of said operating lever, a normally closed switch adapted to be opened at the end of the movement of said weighted lever for stopping the operation of the operating lever by said electro-magnet, another operating lever having a curved head, a weighted bar, a finger, a connecting link between said curved head and said finger, shoulders on said bar on which said finger rests, a cable connecting said weighted bar with the frame, means for allowing an operation of said cable by said weight upon the operation of said second operating lever by said second electro-magnet for raising said frame, and a switch adapted to be closed at the end of the operation of said first named operating lever and to be opened at the end of the operation of said second operating lever, two circuits, one for each electro-magnet, and a contact thermometer for closing said circuits, one at a predetermined highest and one at a predetermined lowest point of temperature, and a bar for coupling the heads of a plurality of frames of one row of plant beds for simultaneous operation.

In testimony whereof I have affixed my signature.

WILHELM HERRMANN.